United States Patent [19]

Harris

[11] 4,046,735
[45] Sept. 6, 1977

[54] STABILIZERS OF NITRILE POLYMERS USING TRIAZINE DERIVATIVES

[75] Inventor: Alva F. Harris, Wilbraham, Mass.

[73] Assignee: Monsanto Company, St. Louis, Mo.

[21] Appl. No.: 719,806

[22] Filed: Sept. 2, 1976

[51] Int. Cl.$^2$ .............................................. C08K 5/34
[52] U.S. Cl. .......................................... 260/45.8 NT
[58] Field of Search ............. 260/45.8 NT, 248, 249.5

[56] References Cited

U.S. PATENT DOCUMENTS

| | | |
|---|---|---|
| 3,156,689 | 11/1964 | Dexter et al. ................. 260/45.8 NT |
| 3,198,797 | 8/1965 | Dexter et al. ................. 260/45.8 NT |
| 3,202,681 | 8/1965 | Dexter et al. ................. 260/45.8 NT |
| 3,245,992 | 4/1966 | Dexter et al. ................. 260/45.8 NT |
| 3,530,127 | 9/1970 | Biland et al. ................. 260/45.8 NT |
| 3,577,416 | 5/1971 | Schwarze et al. .............. 260/249.5 |
| 3,639,399 | 1/1972 | Daughtery et al. ............. 260/249.5 |
| 3,652,561 | 3/1972 | Dexter et al. ................. 260/45.8 NT |
| 3,700,666 | 10/1972 | Robin et al. .................. 260/45.8 NT |
| 3,947,374 | 3/1976 | Loffelman et al. .............. 260/249.5 |

OTHER PUBLICATIONS

Journal of the American Chemical Society-, vol. 73, No. 7, July 6, 1951, pp. 2981 to 2983.
S.C.I. Monograph, No. 13, "Thermal Degradation of Polymers," (1961), Society of Chemical Industry, London, pp. 184 to 199.

Primary Examiner—V. P. Hoke
Attorney, Agent, or Firm—Michael J. Murphy

[57] ABSTRACT

Nitrile polymers are stabilized against color degradation by inclusion of an effective amount of a triazine derivative having the formula;

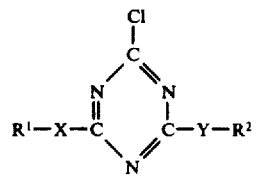

wherein $R^1$ and $R^2$ each independently represent an alkyl or aryl group and X and Y each independently represent O, S, NH or $NR^3$ wherein each $R^3$ independently represents H, alkyl or aryl, with the further proviso that $R^1$ and $R^2$ can be H when X and/or Y is NH, $NR^3$ or S.

10 Claims, No Drawings

STABILIZERS OF NITRILE POLYMERS USING TRIAZINE DERIVATIVES

BACKGROUND OF THE INVENTION

This invention relates to nitrile resin compositions stabilized against color degradation by addition of a selected triazine derivative as a stabilizer. More particularly, this invention involves the stabilization of high nitrile resin compositions against discoloration by inclusion of an effective amount of a triazine derivative having the formula:

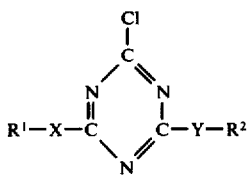

wherein $R^1$ and $R^2$ each independently represent an alkyl or aryl group and X and Y each independently represent O, S, NH or $NR^3$ wherein each $R^3$ represents H, alkyl or aryl with the further proviso that $R^1$ and $R^2$ can be H when X and/or Y is NH, $NR^3$ or S.

In recent years it has been discovered that certain polymeric nitrile resins having a high proportionate amount of olefinic nitrile component are especially suitable for packaging and other applications particularly because of their excellent water and oxygen barrier properties. However, such nitrile resin compositions have a tendency to discolor particularly when subject to the elevated temperatures often required in fabricating processes. While a variety of compounds and particularly phenol compounds, such as disclosed in U.S. Pat. No. 3,202,681 have been generally known to be useful as stabilizers for various organic compositions, many of such stabilizers are not particularly useful for stabilizing nitrile resin compositions against color degradation.

Thus, there exists in the art a need for an improved nitrile resin composition which is stabilized against color degradation. This need is provided by the present invention wherein a selected color stabilizer comprising a monochloro triazine derivative is added to the nitrile composition.

SUMMARY OF THE INVENTION

The present invention fulfills the aforementioned need by providing a high nitrile resin composition which is stabilized against color degradation by the addition of a selected triazine derivative as a stabilizer. More particularly this invention provides a polymer composition stable towards thermal discoloration comprising at least 40% by weight of an olefinically unsaturated mononitrile having the formula:

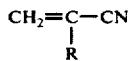

wherein R is hydrogen, a lower alkyl having from 1 to 4 carbon atoms or a halogen and an effective amount of a stabilizing agent having the formula:

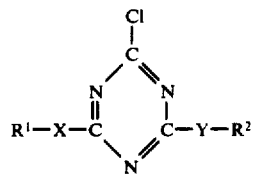

wherein $R^1$ and $R^2$ each independently represent an alkyl group having 1 to 8 carbon atoms or an aryl group having 6 to 20 carbon atoms and X and Y each independently represent O, S, NH or $NR^3$ wherein each $R^3$ independently represents H, an alkyl or aryl group as defined above and with the further proviso that $R^1$ and $R^2$ can be H when X and/or Y is NH, $NR^3$ or S.

DETAILED DESCRIPTION OF THE INVENTION

The high nitrile resin compositions of this invention contain at least 40% by weight of an olefinically unsaturated mononitrile having the formula:

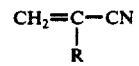

wherein R is hydrogen, a lower alkyl having 1 to 4 carbon atoms or an halogen. Such compounds include acrylonitrile, methacrylonitrile ethacrylonitrile, propioacrylonitrile, alpha chloroacrylonitrile, etc. The most preferred olefinically unsaturated nitriles are acrylonitrile and methacrylonitrile and mixtures thereof.

The nitrile composition of this invention may contain a comonomer material copolymerizable with the olefinically unsaturated nitriles and including:

a. the monovinylidene aromatic hydrocarbon monomers of the formula:

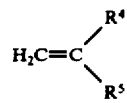

wherein $R^4$ is hydrogen, chlorine or methyl and $R^5$ is an aryl group of 6 to 10 carbon atoms and may also contain substitutes such as halogen as well as alkyl groups attached to the aromatic nucleus, e.g. styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

b. lower alpha olefins of from 2 to 8 carbon atoms, e.g. ethylene, propylene, isobutylene, butene-1, pentene-1 and their halogen and aliphatic substituted derivatives e.g. vinyl chloride, vinylidene chloride, etc.

c. acrylic acid and methacrylic acid and the corresponding acrylate and methacrylate alkyl esters wherein the alkyl group contains from 1 to 4 carbon atoms, e.g. methyl acrylate, ethyl acrylate, propyl acrylate, methyl methacrylate, etc.

d. vinyl esters of the formula:

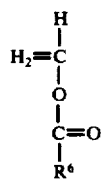

wherein R⁶ is hydrogen, an alkyl group of from 1 to 10 carbon atoms, an aryl group of 6 to 10 carbon atoms, e.g. vinyl formate, vinyl acetate, vinyl propionate, vinyl benzoate, etc.

e. vinyl ether monomers of the formula:

$$H_2C=CH-O-R^7$$

wherein $R^7$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbon or oxygen — containing, i.e. an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

Other useful comonomers in the practice of this invention are those comonomers which contain a mono- or di-nitrile function. Examples of these include methylene glutaronitrile, 2,4-dicyanobutene-1, vinylidene cyanide, crotonitrile, fumarodinitrile, maleodinitrile. The preferred comonomers are the monovinylidene aromatic hydrocarbons, lower alpha olefins and acrylic and methacrylic acid and the corresponding acrylate and methacrylate esters with the monovinylidene aromatic hydrocarbons being more particularly preferred. More specifically preferred is styrene and alpha methylstyrene.

This invention also contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen packaging materials prepared from this invention. This rubbery component may be incorporated into the nitrile containing polymer by any of the methods which are well known to those skilled in the art, e.g., direct polymerization of monomers, polyblends, grafting the acrylonitrile monomer mixture onto the rubbery backbone, etc. Especially preferred are polyblends derived by mixing a graft copolymer of acrylonitrile and comonomer on the rubbery backbone with another copolymer of acrylonitrile and the same comonomer. Generally, such rubber component may comprise from 0 to about 25% and preferably up to about 10% by weight of the nitrile polymer composition.

The stabilizing agents used in this invention generally comprise a monochloro triazine derivative of the formula:

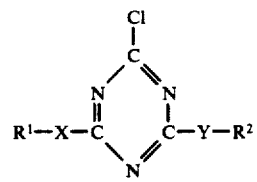

wherein $R^1$ and $R^2$ each independently represent an alkyl group having 1 to 8 and preferably 1 to 4 carbon atoms and an aryl group having 6 to 20 and preferably 6 to 14 carbon atoms; and X and Y each independently represent O, S, NH or $NR^3$ wherein each $R^3$ independently represents H, an alkyl or aryl group as defined above and with the further proviso that $R^1$ and $R^2$ can be H when X and/or Y in NH, $NR^3$ or S. The term "aryl" as defined in this formula is used in a broad sense to include substituted groups, e.g. alkyl, aralkyl, alkaryl, alkaralkyl and aralkaryl.

Compounds of this type include 2-chloro-4,6-diamino-s-triazine, 2-chloro-4,6-di (dimethylamino)-s-triazine, 2-chloro-4,6-di(thiophenyl)-s-triazine, 2,chloro-4,6-diphenoxy-s-triazine, 2-chloro-4,6-di (para benylphenoxy)-s-triazine, 2-chloro-4,6-dimethoxy-s-triazine, etc.

Generally an effective stabilizing amount of the triazine derivative is used in the nitrile composition of this invention. More particularly from about 0.005 to about 0.5% of stabilizing agent based on the total weight of nitrile composition is used and preferably from about 0.01 to about 0.2% is used. The nitrile component will preferably comprise from about 55 to about 90% and more preferably from about 60 to about 85%% by weight, based on the total polymer weight.

The triazine stabilizers are generally incorporated into the nitrile resin composition by blending therein. Other techniques may be used such as by adding the stabilizers either during the polymerization reaction or after it has been completed provided the chlorine on said triazine does not hydrolyze. This may be carried out for example by adding it to the nitrile polymer in the polymer recovery steps such as during coagulation, stripping, washing, drying, etc. or by steeping the polymer in a liquid containing the triazine derivative. A preferred method is to dry blend the nitrile polymer and triazine derivative prior to further fabrication steps.

The triazine derivatives of this invention may be prepared using the preparatory procedures of the general type disclosed in a series of articles entitled, "Cyanuric Chloride Derivatives" in the Journal of the American Chemical Society, Vol. 73, July 6, 1951, pp. 2981-3007.

The nitrile compositions may be prepared by any of the known general techniques of polymerization including bulk or mass polymerization, solution polymerization and emulsion or suspension polymerization. Other additive agents which are well known in the art may be used in addition to the triazine derivatives if desired, e.g. dyes and pigments, plasticizers, fillers, lubricants, etc.

The following examples are set forth in illustration of the present invention and should not be construed as limitations thereof.

EXAMPLE I

A 1500 g nitrile polymer composition containing 70% acrylonitrile and 30% styrene was blended with 0.075% by weight of 2-chloro-4,6-di(para benzylphenoxy)-s- triazine using a Hobart mixer at low speeds for 15 minutes. The blend was then extruded in a 1 inch Killion extruder with 2 stage screw at a stock temperature of 435° F and molded in a one ounce Arburg molding machine at 425° F. Measurements were taken to determine the yellowness Index (YI) using the standard test procedure ASTM D-1925-70 and the three point yellowness (3PY) for the extruded polymer. Three point yellowness (3PY) was determined on an Arburg molded chip (3× x 4× x 0.100×) using a General Electric Diano-Hardy recording spectrophotometer. Reflectance readings, R were made at 420, 500 and 700 millimicrons (mμ) and the numbers inserted into the following formula to arrive at the 3PY value for the molded sample:

$$3PY = 2R_{700} - R_{500} - R_{420}$$

The results indicated an 18.1% reduction in 3PY and 28% in YI when compared to a similar acrylonitrile/styrene composition without the triazine stabilizer.

EXAMPLE II

A similar sample as described in Example I was prepared using 0.15% of 2-chloro-4,6dimethoxy-s-triazine and the results indicated a reduction in YI of 22.3% and 3PY of 15.1%.

EXAMPLE III

Similar samples as described in Example I were prepared using 0.1% of the noted triazine with the % reduction in 3PY as noted in parenthesis: 2-chloro-4,6-diamino-s-triazine (6%), 2-chloro-4,6-diphenoxy-s-triazine (8%), 2-chloro-4,6-di (dimethylamino)-s-triazine (4%) and 2-chloro-4,6-dithiophenyl-s-triazine (6%).

What is claimed:

1. A nitrile polymer composition stable toward thermal discoloration which comprises a polymer of at least 40% by weight of a nitrile monomer having the formula:

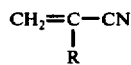

wherein R is hydrogen, lower alkyl having from 1 to 4 carbon atoms or halogen and an effective amount of a stabilizing agent having the formula:

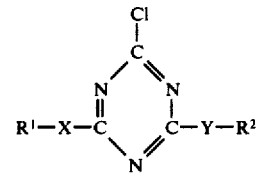

wherein $R^1$ and $R^2$ each independently represent an alkyl group having 1 to 8 carbon atoms or an aryl group having 6 to 20 carbons; and X and Y each represent O, S, NH or $NR^3$ wherein each $R^3$ independently represents H, an alkyl group of 1 to 8 carbon atoms or an aryl group of 6 to 20 carbon atoms with the proviso that $R^1$ and $R^2$ may be H when X and/or Y is NH, $NR^3$ or S.

2. The composition of claim 1 wherein from about 0.005 to about 0.5% by weight of said stabilizing agent based on the total weight of nitrile composition is used.

3. The composition of claim 2 wherein said alkyl group in the stabilizing agent contains from 1 to 4 carbon atoms and said aryl group in the stabilizing agent contains 6 to 14 carbon atoms.

4. The composition of claim 1 wherein said nitrile monomer is acrylonitrile.

5. The composition of claim 1 wherein said composition contains a comonomer material selected from the group consisting of:

a. monovinylidene aromatic hydrocarbon monomers of the formula:

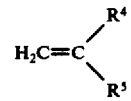

wherein $R^4$ is hydrogen, chlorine or methyl and $R^5$ is an aryl group of 6 to 10 carbon atoms.

b. lower alpha olefins of from 2 to 8 carbon atoms; and c. acrylic acid and methacrylic acid and the corresponding acrylate and methacrylate alkyl esters wherein the alkyl group contains 1 to 4 carbon atoms.

6. The composition of claim 5 wherein from about 0.005 to about 0.5% by weight of said stabilizing agent based on the total weight of nitrile composition is used.

7. The composition of claim 6 wherein said nitrile polymer is acrylonitrile.

8. The composition of claim 7 wherein said comonomer is styrene, said alkyl group in the stabilizing agent contains 1 to 4 carbon atoms and said aryl group in the stabilizing agent contains 6 to 14 carbon atoms.

9. The composition of claim 8 wherein from about 0.01 to about 0.2% by weight of said stabilizing agent based on the total weight of the composition is used.

10. The composition of claim 9 wherein said stabilizing agent is selected from the group consisting of 2-chloro-4,6-di (para benzylphenoxy)-s-triazine, 2-chloro-4,6-dimethoxy-s-triazine, 2-chloro-4,6-diamino-s-triazine, 2-chloro-4,6-diphenoxy-s-triazine, 2-chloro-4,6-di (dimethylamino)-s-triazine and 2-chloro-4,6-dithiophenyl-s-triazine.